UNITED STATES PATENT OFFICE.

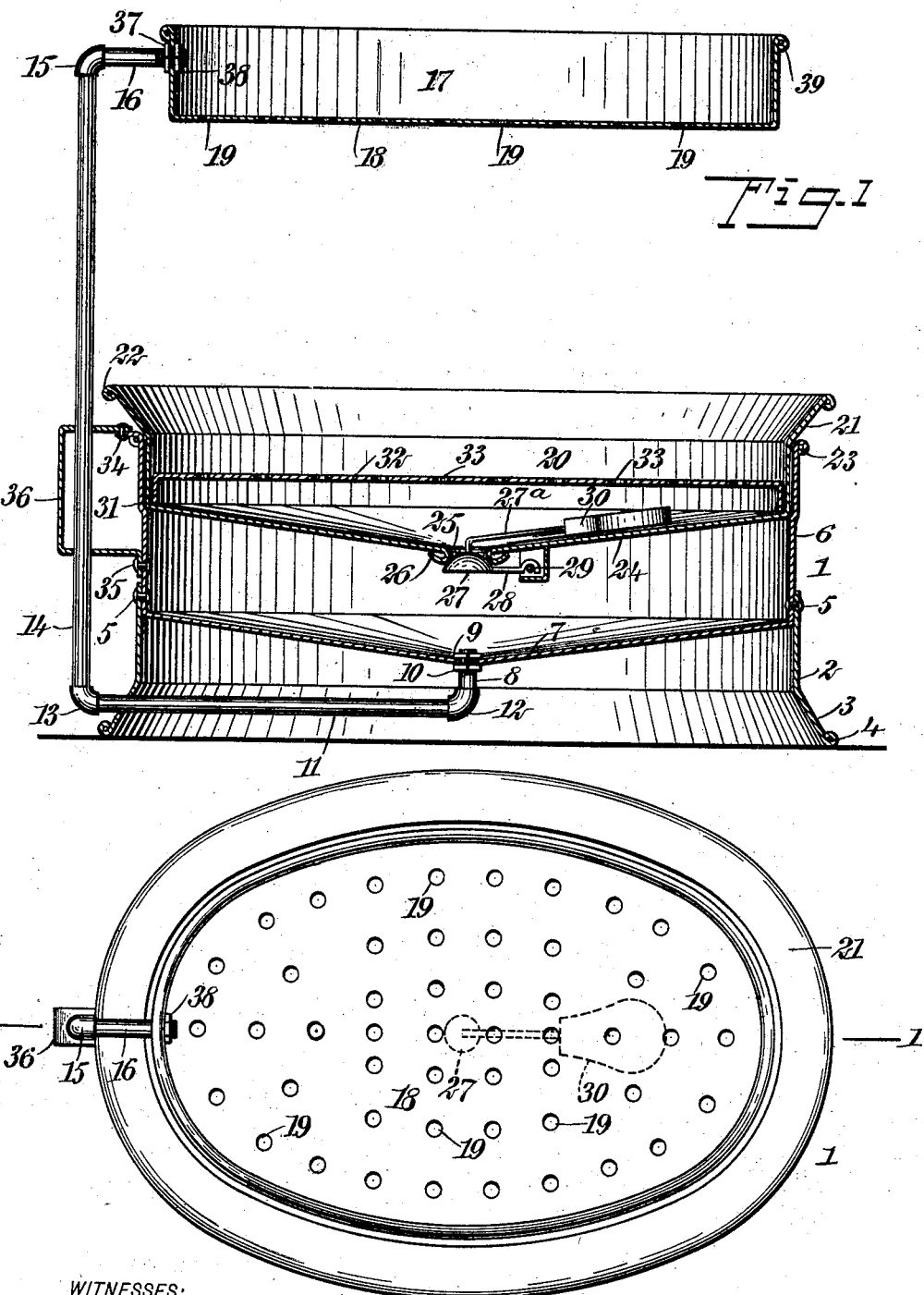

DANIEL G. WALKER, OF LINDSAY, NEBRASKA.

DEVICE FOR ROASTING MEATS AND THE LIKE.

No. 833,566.  Specification of Letters Patent.  Patented Oct. 16, 1906.

Application filed September 26, 1905. Serial No. 280,110.

*To all whom it may concern:*

Be it known that I, DANIEL G. WALKER, a citizen of the United States, and a resident of Lindsay, in the county of Platte and State of Nebraska, have invented a new and Improved Device for Roasting Meats and the Like, of which the following is a full, clear, and exact description.

This invention relates to culinary vessels; and it consists substantially in the details of construction and combinations of parts hereinafter more particularly described, and pointed out in the claims.

The invention has reference more especially to devices for roasting meats and the like, being substantially of the type of device for similar purposes set forth and described in my Patent No. 814,752, granted March 13, 1906.

One of the principal objects of the present invention is to provide a device of this kind of an embodiment to overcome numerous disadvantages and objections encountered in the use of many other contrivances of the kind hitherto devised.

A further object is to provide a device of the character referred to which is simple in construction and comparatively inexpensive to manufacture, besides being thoroughly effective and reliable for its purposes and possessing the capacity for long and repeated service.

The above and additional objects are attained by means substantially such as are illustrated in the accompanying drawings, in which—

Figure 1 is a vertical sectional view of a culinary vessel embodying my improvements, taken on the line 1 1 of Fig. 2; and Fig. 2 is a top plan view thereof.

Before proceeding with a more detailed description, it may be stated that in the form of my improvements herein shown I employ a culinary vessel comprising a specially-construced base member, in which is supported a specially-constructed reservoir for collecting the meat-juices and basting fluid employed in roasting meats and the like within the structure, in which is supported in turn a specially-constructed removable roasting-pan, having seated therein a specially-constructed support for the meat, said roasting-pan having an outlet controlled by a specially-constructed float-operated valve, as will presently be explained. Leading from the reservoir referred to is a horizontally-disposed pipe, in connection with which is a vertically-disposed pipe having a branch at the upper end thereof, to which is attached a specially-constructed distributer for the basting fluid, disposed a suitable height above the roasting-pan, and, while I have herein represented my improvements in a certain preferred embodiment, it will be understood, of course, that I am not limited thereto in precise detail, since immaterial changes therein may be resorted to coming within the scope of my invention.

Reference being had to the drawings by the designating characters thereon, 1 represents my improved culinary vessel or meat-roasting device in entirety, the same being of suitable shape and dimensions and comprising a lower or base member 2 of suitable height, having, preferably, an outwardly-turned supporting-flange 3, the lower edge of which may or may not be formed with a strengthening-bead 4, as shown in Fig. 1. Fitting within the upper portion of said base member 2 and secured to the latter, as by means of rivets 5 or the like, is a steam and water tight reservoir 6, provided with an inverted conical bottom 7, at the apex of which is an opening in which is fitted a short pipe-section 8, secured to said bottom in any suitable way, as by means of lock-nuts 9 and 10, said pipe-section having communication with the inner end of a horizontally-disposed pipe 11, through the medium of an elbow connection 12, the said pipe 11 having at the outer end thereof an elbow 13, connecting the same to the lower end of a vertically-disposed pipe 14, extending for a suitable height above my improved device and having connected to the upper end thereof, by means of an elbow 15, a short horizontally-disposed pipe-section 16, the free end of which is externally threaded and enters an opening therefor in the side of the distributing-pan 17, the bottom 18 of which is provided throughout with perforations 19, said pan being for the purpose of containing the basting fluid employed when roasting meats or the like by the use of my improved structure.

The sides of the reservoir 6 are preferably formed with an inner annular shoulder 31 for removably supporting within said reservoir the roasting-pan 20, the upper portion of which is preferably flaring, as shown at 21, and the edge of which portion may be bent at 22 to form a strengthening-bead, as may also the upper edge of the reservoir be bent at 23 to form a similar bead. The said roasting-pan 20 is provided with an inverted conical bottom 24, the same being practically parallel with the similar bottom 7 of the reservoir 6 and being formed at the apex thereof with an outlet-opening 25, having the continuous edge thereof bent or turned under at 26 to form a seat for practically an inverted-cup-shaped valve 27, having a lateral projection 28, the free end of which is hinged to a support at 29 in any suitable way. Said valve 27 is provided at the upper part thereof with a stem 27ª, which is bent to one side substantially in parallelism with the surrounding parts of the bottom 24 of the roasting-pan 20 and is provided at the end thereof with a float 30, of cork or other equivalent material. Removably seated upon the bottom 24 of the roasting-pan near the sides of the latter is the annular supporting-flange 31 of a support 32 for the meat to be roasted, the same being provided with numerously-disposed perforations 33, as shown. The structure has riveted thereto at 34 and 35 a suitable handle 36, by which the same may be grasped and carried about, and it is apparent that in the use of the structure the heating thereof may be derived in any suitable way—as, for instance, by placing the same upon a stove or within an oven. The said handle has openings therein through which the vertically-disposed pipe 14 extends, the latter being thereby braced by the handle.

From the foregoing it will be understood that the meat to be roasted is placed upon the support 32 therefor in the roasting-pan, and a suitable quantity or amount of basting fluid is placed within the pan 17 therefor, which fluid drips through the perforations in the bottom of the pan 17 and falls onto the meat within the said roasting-pan. After performing its function in the roasting-pan the basting fluid drips through the perforations in the support 32 and collects on the bottom 7 of the reservoir 6, as is apparent. Some of the basting fluid within the reservoir is converted into vapor which after acquiring a certain amount of pressure operates upwardly against the valve 27, which, it will be understood, had previously been held open in virtue of the float 30 being held in raised position from the bottom 24 of the roasting-pan by the quantity of basting fluid on said bottom. This closing of the valve 27 causes the vapor within the reservoir 6 to exert pressure on the remaining basting fluid on the bottom 7 of the reservoir, causing this fluid to be forced through the pipe-section 8, thence into the pipe 11, and upwardly through the pipe 14, thence through the horizontally-disposed section 16, and into the pan 17, it being seen that in this way the device is automatically operating in character in continuously causing the basting fluid to follow the described circuit therethrough in the roasting of meats or the like.

The device is effective and reliable for its purposes, besides being simple in construction and practically self-controlling.

The pan 17 is secured in position on the end of the pipe-section 16 by means of locknuts 37 and 38, as shown, and the upper edge thereof may, if desired, be formed with a strengthening-bead 39.

It will be seen that the several elements of the structure may be readily taken apart for cleansing or repair or for any other purpose and again operatively associated or put together.

Having thus described my invention, I claim as new and desire to secure by Letters Patent—

1. A structure of the character described, comprising a reservoir, a superposed roasting-pan, provided with a valve-controlled opening in the bottom thereof, an elevated baste-pan having a perforated bottom, and a tubular connection between the reservoir and the baste-pan.

2. A structure of the character described, comprising a reservoir, a superposed roasting-pan, provided with a valve-controlled opening in the bottom thereof, an elevated baste-pan having a perforated bottom, and a tubular connection between the reservoir and the baste-pan forming a support for the latter.

3. A structure of the character described, comprising a reservoir, having an inverted conical bottom provided with an opening at the apex thereof, a superposed roasting-pan having a similar bottom also provided at the apex thereof with an opening, an upwardly-closing valve controlling this opening, an elevated baste-pan having a perforated bottom, and means of communication between the reservoir and baste-pan leading from said first-named opening.

4. A structure of the character described, comprising a reservoir, having an inverted conical bottom provided with an opening at the apex thereof, a superposed roasting-pan having a similar bottom also provided at the apex thereof with an opening, an upwardly-closing valve controlling this opening, an elevated baste-pan having a perforated bottom, and means of communication between the reservoir and baste-pan leading from said first-named opening, said valve having a float normally resting on the said bottom of the roasting-pan.

5. A structure of the character described, comprising a reservoir, having an inverted conical bottom provided with an opening at the apex thereof, a superposed roasting-pan having a similar bottom also provided at the apex thereof with an opening, an upwardly-closing valve controlling this opening, an elevated baste-pan having a perforated bottom, and means of communication between the reservoir and baste-pan leading from said first-named opening, said valve being hinged beneath the roasting-pan and having a stem provided with a float normally resting on the bottom of this pan.

6. A structure of the character described, comprising a reservoir, a superposed roasting-pan, provided with a valve-controlled opening in the bottom thereof, an elevated baste-pan having a perforated bottom, a tubular connection between the reservoir and the baste-pan, and a perforated holder in the roasting-pan.

7. A structure of the character described, comprising a reservoir, having an inverted conical bottom provided with an opening at the apex thereof, a superposed roasting-pan having a similar bottom also provided at the apex thereof with an opening, an upwardly-closing valve controlling this opening, an elevated baste-pan having a perforated bottom, means of communication between the reservoir and baste-pan leading from said first-named opening, and a perforated holder in the roasting-pan.

8. A structure of the character described, comprising a base member, a reservoir secured within the same, provided with an inverted conical bottom having an opening at the apex thereof, a roasting-pan removably seated within the reservoir, also provided with an inverted conical bottom having an opening at the apex thereof, an upwardly-closing valve for controlling the last-named opening, the same being provided with a float normally resting on the said bottom of the roasting-pan, an elevated baste-pan, and a pipe connection between the latter and the reservoir, leading from said first-named opening.

In testimony whereof I have signed my name to this specification in the presence of two subscribing witnesses.

DANIEL G. WALKER.

Witnesses:
 CHAS. E. CHARNQUIST,
 M. J. SAMARKERS.